(12) United States Patent
Backfolk et al.

(10) Patent No.: US 11,458,714 B2
(45) Date of Patent: Oct. 4, 2022

(54) HEAT-SEALABLE PACKAGING MATERIAL

(71) Applicant: Stora Enso OYJ, Helsinki (FI)

(72) Inventors: Kaj Backfolk, Villmanstrand (FI); Isto Heiskanen, Imatra (FI); Esa Saukkonen, Lappeenranta (FI); Jukka Kankkunen, Imatra (FI)

(73) Assignee: Stora Enso OYJ, Helsinki (FI)

( * ) Notice: Subject to any disclaimer, the term of this patent is extended or adjusted under 35 U.S.C. 154(b) by 129 days.

(21) Appl. No.: 16/955,900

(22) PCT Filed: Dec. 19, 2018

(86) PCT No.: PCT/IB2018/060302
§ 371 (c)(1),
(2) Date: Jun. 19, 2020

(87) PCT Pub. No.: WO2019/123290
PCT Pub. Date: Jun. 27, 2019

(65) Prior Publication Data
US 2021/0017717 A1 Jan. 21, 2021

(30) Foreign Application Priority Data
Dec. 21, 2017 (SE) .................................. 1751595-8

(51) Int. Cl.
| B32B 27/32 | (2006.01) |
| B29C 65/32 | (2006.01) |
| B29C 65/36 | (2006.01) |
| B32B 27/12 | (2006.01) |
| D21H 11/18 | (2006.01) |
| D21H 19/22 | (2006.01) |
| D21H 19/80 | (2006.01) |
| D21H 27/10 | (2006.01) |
| B29C 65/00 | (2006.01) |

(52) U.S. Cl.
CPC .............. *B32B 27/32* (2013.01); *B29C 65/32* (2013.01); *B29C 65/368* (2013.01); *B29C 65/3656* (2013.01); *B29C 66/71* (2013.01); *B29C 66/723* (2013.01); *B29C 66/7352* (2013.01); *B29C 66/73921* (2013.01); *B32B 27/12* (2013.01); *D21H 11/18* (2013.01); *D21H 19/22* (2013.01); *D21H 19/80* (2013.01); *D21H 27/10* (2013.01); *B32B 2307/31* (2013.01); *B32B 2307/7244* (2013.01); *B32B 2307/746* (2013.01); *B32B 2439/00* (2013.01)

(58) Field of Classification Search
CPC ..... B32B 27/32; B32B 27/12; B32B 2307/31; B32B 2307/7244; B32B 2307/746; B32B 2439/00; B29C 65/32; B29C 65/3656; B29C 65/368; B29C 66/71; B29C 66/723; B29C 66/7352; B29C 66/73921; D21H 11/18; D21H 19/22; D21H 19/80; D21H 27/10
USPC .......................................................... 53/477
See application file for complete search history.

(56) References Cited

U.S. PATENT DOCUMENTS

| 3,445,324 | A | * | 5/1969 | Curler ..................... B32B 27/00 428/218 |
| 5,680,747 | A | | 10/1997 | Spatafora et al. |
| 2011/0167763 | A1 | * | 7/2011 | Waldherr .......... B29C 66/83241 53/370.7 |
| 2012/0251818 | A1 | * | 10/2012 | Axrup ..................... D21H 11/18 428/326 |

FOREIGN PATENT DOCUMENTS

| EP | 0898466 A1 | 3/1999 |
| WO | 9742897 A1 | 11/1997 |
| WO | 2017046754 A1 | 3/2017 |
| WO | WO-2017046754 A1 * | 3/2017 ............. D21H 17/32 |
| WO | 2017089508 A1 | 6/2017 |
| WO | 2017163167 A1 | 9/2017 |

* cited by examiner

*Primary Examiner* — Michael M. Bernshteyn
(74) *Attorney, Agent, or Firm* — Greer, Burns & Crain, Ltd.

(57) ABSTRACT

The present invention is directed to a packaging material free from aluminium in the form of a continuous foil or film, comprising a layer of microfibrillated cellulose (MFC), wherein the layer comprising MFC has been laminated or coated on at least one side with a heat-sealable material. The MFC layer contains at least 60% by weight of microfibrillated cellulose. The present invention is also directed to a method for induction sealing, wherein a packaging material to be heat-sealed by induction is placed against an induction heating surface.

9 Claims, No Drawings

HEAT-SEALABLE PACKAGING MATERIAL

This application is a U.S. National Phase under 35 U.S.C. § 371 of International Application No. PCT/IB2018/060302, filed Dec. 19, 2018, which claims priority under 35 U.S.C. §§ 119 and 365 to Swedish Application No. 1751595-8, filed Dec. 21, 2017.

TECHNICAL FIELD

The present invention is directed to a heat-sealable packaging material free from aluminium in the form of a continuous foil or film, comprising a layer of microfibrillated cellulose (MFC), wherein the layer comprising MFC has been laminated or coated on at least one side with a heat-sealable material. The MFC layer contains at least 60% by weight of microfibrillated cellulose. The present invention is also directed to a method for induction sealing, wherein a packaging material to be heat-sealed by induction is placed against an induction heating surface.

BACKGROUND

Packages used for sensitive objects such as liquid beverages need to have sufficient barrier properties. Typically, aluminium is used for these purposes and generally provides sufficient properties with regard to penetration of gas, such as oxygen. The aluminium layer is also an aroma barrier and plays an important function in heat sealing.

Heat sealing is used in packaging primarily for producing or closing wraps, bags, pouches, cartons, tubes, blister packs, thin wall containers, kits and various components.

There are several methods useful for heat sealing, including impulse sealing, dielectric heat sealing and thermal heat sealing.

Induction is commonly used as a means to heat seal packages. This is traditionally based on the presence of a sufficient amount of conductive material to generate heat and thereby enable heat sealing.

One issue with the use of aluminium is that it poses an environmental challenge, is a problem in the recycling process and is not compostable. It would therefore be desirable to replace aluminium with renewable materials. However, it is essential to maintain the barrier properties of the packaging material to the extent it is to be used in packages for e.g. liquids and it is also important that the packaging material is sufficiently crack-resistant. Many packaging lines and units are equipped with induction sealers. This means also that the packaging materials must contain an aluminium layer or a foil (or similar materials) in order to be induction sealable.

The use of an aluminum layer provides good barrier properties, but is leading to problems in respect of sustainability value, recycling, and costs.

Embedding substances that enable induction sealability of a polymer film or coating or biofilm is an option, but can also lead to problems in performance, recyclability and costs. Addition of functional chemicals or particles to, for example, wet end or coating process might be an option but this might increase the risks of negatively influencing barrier properties or laminate or barrier manufacturing process.

Therefore, an aluminium free coating or a film without embedded inductive substances which can still be used in induction sealing without being damaged due to the heat sealing process is needed.

SUMMARY OF THE INVENTION

It has surprisingly been found that by using a layer of microfibrillated cellulose (MFC) wherein the layer comprising MFC has been laminated or extrusion coated on at least one side with a heat-sealable material, it is possible to achieve a packaging material suitable for heat sealing using methods such as, but not limited to, induction sealing, even when the packaging material is free from aluminium in the form of a continuous foil or film.

The present invention is thus directed to a packaging material that is free from aluminium in the form of a continuous foil or film, comprising a layer of MFC, wherein the layer comprising MFC has been laminated or coated on at least one side with a heat-sealable material. The heat-sealable material may be provided on one or both sides of the MFC layer.

To facilitate the induction sealing, one side of the packaging material may optionally be provided with a coating that does not adhere to or stick to surfaces, specifically metal surfaces such as aluminum surfaces when heated. Thus, that coating prevents the coated surface from adhering to a heated metal surface. Examples of such coatings include starch, a wax, a mineral or pigment coating or a polymer having a higher melting point than the heat-sealable material. If the coating that prevents the coated surface from adhering to a heated metal surface is a polymer, it may also contain one or more antisticking and/or antiblocking agents, to further reduce the risk of adhering to the metal surface. The coating that does not adhere to or stick to surfaces is preferably provided in an amount of up to 20 $g/m^2$, such as from 0.1 $g/m^2$ to 20 $g/m^2$, preferably 0.5 $g/m^2$ to 15 $g/m^2$ or 0.5 $g/m^2$ to 5 $g/m^2$. Alternatively, the packaging material does not adhere to a heated metal surface.

The packaging material according to the present invention preferably has a thickness of less than 50 μm, such as less than 45 μm, less than 40 μm, or less than 35 μm.

The layer of MFC is preferably in the range of from 5 to 50 gsm, such as from 5-30 gsm or from 10-30 gsm. The MFC may be native or modified and may be a mix of native and modified MFC as well as a mix of native MFC and different types of modified MFC. If the MFC is modified it may be phosphorylated or PCC coated MFC. The MFC may be produced from pulp, such as from dissolving pulp.

The layer of MFC has an OTR (oxygen transmission rate) value of less than 500 $cm^3/m^2$*day at 23° C./50% RH for a 20-30 gsm MFC layer. Preferably, the OTR value is less than 450 $cm^3/m^2$*day at 23° C./50% RH. More preferably, the OTR value is less than 400 $cm^3/m^2$*day at 23° C./50% RH, less than 200 $cm^3/m^2$*day at 23° C./50% RH or less than 100 $cm^3/m^2$*day at 23° C./50% RH. The OTR can be determined using methods known in the art.

The layer of MFC in combination with the heat-sealable material according to the present invention has an OTR (oxygen transmission rate) value of less than 400 $cm^3/m^2$*day at 23° C./50% RH. Preferably, the OTR value is less than 300 $cm^3/m^2$*day at 23° C./50% RH. More preferably, the OTR value is less than 100 $cm^3/m^2$*day at 23° C./50% RH. The OTR can be determined using methods known in the art.

The packaging material according to the present invention can be subjected to printing through a reel to reel or reel to sheet or sheet fed printing process, but can also be subjected to off-line surface treatment with other technologies such as flexogravure, rotogravure, reverse rotogravure, silk screen printing, inkjet printing, offset printing (lithography), spray, curtain, foam or other printing or surface treatment techniques.

The packaging material according to the present invention may be biodegradable and/or compostable. In this context, compostability is defined in accordance with ISO 18606, i.e.

constituents in the whole material which are present at concentrations of less than 1% do not need to demonstrate biodegradability. However, the sum of such constituents shall not exceed 5%. Biodegradability is defined as follows: the ultimate aerobic biodegradability shall be determined for the whole material or for each organic constituent which is present in the material at a concentration of more than 1% (by dry mass). Constituents present at levels between 1 to 10% shall be tested individually.

One aspect of the present invention is a method for induction sealing, wherein the packaging material according to the present invention can be subjected to induction sealing, even though the packaging material is free from aluminium in the form of a continuous foil or film. In this method for induction sealing, the packaging material according to the present invention is brought into close proximity or brought into contact with a surface that can be heated by induction, such as a metal surface, such as an aluminium surface, which is arranged in such a way that it can be heated by induction and used to heat and thereby seal a packaging material, under applied pressure, according to the present invention. Thus, according to this method, existing equipment for induction heat sealing can readily be adapted for use in accordance with the present method for induction sealing of a packaging material according to the present invention. The heated surface may be an aluminium substrate or counterpiece.

When carrying out the induction sealing, the packaging material is arranged such that at least one of the two surfaces to be sealed together is provided with a heat-sealable material. The heat from the heated surface is conducted through the packaging material and heats the heat-sealable material so that it softens or melts sufficiently to obtain the desired sealing. If one side of the packaging material is coated with a material that does not stick to surfaces, then the side of the packaging material provided with the material that does not stick to surfaces is brought into close proximity or contact with the surface heated by induction. However, the packaging material according to the present invention may also be heat sealed to a surface which is not a packaging material according to the present invention.

The packaging material according to the present invention can be used for any type of final packaging product where induction heat sealability is desirable. In particular, the packaging product according to the present invention can be used as a closure, lid, liquid packaging product or pouch.

DETAILED DESCRIPTION

The microfibrillated cellulose used according to the present invention can be prepared using methods known in the art.

The term "free from aluminium in the form of a continuous foil or film" as used herein in the context of a packaging material, means a packaging material that does not comprise aluminium in the form of a continuous foil or film. In this context, foil or film has a thickness of at least 250 nm and is continuous, i.e. essentially free from pin holes. Thus, the packaging material typically comprises less than 2% by weight of aluminium, such as less than 1% by weight of aluminium or less than 0.5% by weight of aluminium.

The MFC layer may be plasma treated or corona treated prior to adding the heat-sealable material. The heat-sealable material may be provided directly on the MFC layer. Alternatively, one or more layers can be provided between the MFC layer and the heat-sealable material. Such layers provided between the MFC layer and the heat-sealable material may for example provide additional barrier properties and/or improve the adhesion between the MFC layer and the heat-sealable material.

The heat-sealable material is a material which can be provided as a layer and which has a melting point and/or a glass transition temperature such that it is suitable for use in heat-sealing. Examples of such heat-sealable materials include thermoplastic polymers such as polypropylene or polyethylene. Further examples are waxes and hot melts. Additional examples include vinylic polymers (PVC and PVDC based), acrylate and styrene acrylate based polymers, acrylate/polyolefin copolymers, styrene copolymers, polyesters, polypropylene dispersions, ethylene copolymers (EAA and EMAA), ethylene terpolymer (EVA) or styrene acrylic latex or styrene butadiene latex. Thus, the heat-sealable material can be applied as a coating, for example by dispersion coating, extrusion coating or emulsion coating. The heat-sealable material can also be applied by printing.

The layer comprising the heat-sealable material may also contain additives such as waxes/slip agents: Polyethylene wax, AKD, Carnauba wax, PTFE, Fatty acid ester; inorganic pigments/filler: silica, talc; antioxidants/UV-stabilizer/optical brighteners and antifoaming agents.

In one embodiment of the present invention, the MFC layer is formed in a paper making machine or according to a wet laid production method, by providing a suspension onto a wire and dewatering the web to form an intermediate thin substrate or said film. A suspension comprising microfibrillated cellulose is provided to form said film.

In one embodiment of the present invention, the MFC layer used in accordance with the present invention can be made according to any known processes described in the art such as wet laid methods, coating, printing, extrusion, lamination etc.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods.

The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides*, Tappi J., March 1970, Vol 53, No. 3), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 300 m$^2$/g, such as from 1 to 200 m$^2$/g or more preferably 50-200 m$^2$/g when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CM), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size fibrils.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated. MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofibril (CMF) defining a cellulose nanofiber material containing multiple elementary fibrils with both crystalline and amorphous regions.

According to another embodiment, the suspension may comprise a mixture of different types of fibers, such as microfibrillated cellulose, and an amount of other types of fiber, such as kraft fibers, fines, reinforcement fibers, synthetic fibers, dissolving pulp, TMP or CTMP, PGW, etc.

The suspension may also comprise other process or functional additives, such as fillers, pigments, wet strength chemicals, dry strength chemicals, retention chemicals, cross-linkers, softeners or plasticizers, adhesion primers, wetting agents, biocides, optical dyes, fluorescent whitening agents, de-foaming chemicals, hydrophobizing chemicals such as AKD, ASA, waxes, resins etc. Additives can also be added using a size press.

There are several methods for preparing a film of MFC, including wire forming and cast forming. In wire forming, a suspension, comprising microfibrillated cellulose, is dewatered on a porous surface to form a fibrous web. A suitable porous surface is e.g. wire in a paper machine. The fibrous web is then dried in a drying section in a paper machine to form the MFC film, wherein the film has a first side and a second side. The papermaking machine that may be used in the process according to the present invention may be any type of machine known to the skilled person used for the production of paper, paperboard, tissue or similar products, alternatively for example a modified or non-conventional papermaking machine.

The furnish is placed onto the wire and then a web is formed, which may be dewatered to form an intermediate thin substrate or film. In cast forming, the suspension, comprising MFC, is for example applied on a supporting medium with a non-porous surface. The non-porous surface is e.g. a plastic or metal belt on which the suspension is evenly spread and the MFC film is formed during drying. The MFC film is then peeled off from the supporting medium in order to form a stand-alone film, wherein the film has a first side and a second side.

Preferably, the MFC layer is laminated or extrusion coated or dispersion coated with a thermoplastic polymer which may be a bio-based and/or biodegradable thermoplastic polymer. The thermoplastic film typically has a melting point of from 60° C. to 220° C. In one embodiment of the present invention, the thermoplastic polymer is selected from thermoplastic cellulose, thermoplastic starch (modified starch), polyethylene (PE), polypropylene (PP), high-density polyethylene (HDPE), low-density polyethylene (LDPE), linear-low density polyethylene (LLDPE), polylactic acid (PLA), polycaprolactone, polyglycolide (PGA), ethylene vinyl acetate (EVA), ethylene vinyl alcohol (EVOH), polyamide (PA), ionomers (e.g. Surlyn) or combinations thereof. The thermoplastic film is typically present at at least 5 g/m$^2$, such as at least 15 g/m$^2$, such as at least 20 g/m$^2$ or at least 30 g/m$^2$.

In one embodiment of the present invention, the MFC layer is laminated with the thermoplastic polymer. The lamination can be carried out using methods known in the art.

A final packaging product, such as a final liquid packaging board comprising the packaging material according to the present invention may comprise several layers, i.e. be a multilayer structure. The heat-sealable packaging material according to the present invention is useful for example in packages for wrapping objects, bags, pouches, cartons, tubes, blister packs, thin wall containers etc. The packaging material according to the present invention may also be used as a seal or lid for a container, i.e. the packaging material may applied to seal the package, wherein the package may be manufactured from any material on which the packaging material according to the present invention may provided as seal. In one embodiment, the container to be sealed with a packaging material according to the present invention may contain a sufficient of aluminium in the area on which the seal is to be provided, to allow heat sealing by induction.

In view of the above detailed description of the present invention, other modifications and variations will become apparent to those skilled in the art. However, it should be apparent that such other modifications and variations may be effected without departing from the spirit and scope of the invention.

The invention claimed is:

1. A heat-sealable packaging material, free from aluminum in the form of a continuous foil or film, the heat-sealable packaging material comprising:
   a layer that comprises at least 60% by weight of microfibrillated cellulose, wherein the layer comprising at least 60% by weight of microfibrillated cellulose is laminated or coated with a heat-sealable material, wherein a thickness of the heat-sealable packaging material is less than 70 μm, and wherein at least one side of the heat-sealable packaging material is provided with a coating that prevents the at least one side form adhering to a heated metal surface selected from a group consisting of starch, a wax, a mineral coating, or pigment coating.

2. The heat-sealable packaging material according to claim 1, wherein the heat-sealable material is selected from the group consisting of: polyethylene, polypropylene, polylactic acid, styrene acrylic latex, styrene butadiene latex, and mixtures thereof.

3. The heat-sealable packaging material according to claim 1, wherein said heat-sealable material comprises a thermoplastic polymer.

4. The heat-sealable packaging material according to claim 3, wherein said thermoplastic polymer is polyethylene.

5. The heat-sealable packaging material according to claim 1, wherein the microfibrillated cellulose is native microfibrillated cellulose, modified microfibrillated cellulose, or a mixture thereof, and wherein the modified microfibrillated cellulose is phosphorylated microfibrillated cellulose or PCC coated microfibrillated cellulose.

6. A method of manufacturing the heat-sealable packaging material according to claim 1, the method comprising the steps of
   a) preparing the layer of at least 60% by weight of microfibrillated cellulose;
   b) laminating or coating the layer of step a) with the heat-sealable material on at least one side of the microfibrillated cellulose layer.

7. A method for induction sealing, wherein the material to be sealed by induction is free from aluminum in the form of a continuous foil or film, the method comprising:
   bringing the heat-sealable packaging material according to claim 1 into close proximity or contact with a surface;
   heating the surface by induction, thereby heating and sealing, under applied pressure, the heat-sealable packaging material to provide a heat-sealed package.

8. The method according to claim 7, wherein the sealing is achieved by softening or melting of the heat-sealable material and by applying a pressure to the softened or melted heat-sealable material.

9. The heat-sealable packaging material according to claim 3, wherein said thermoplastic polymer has been extrusion coated or dispersion coated on the layer comprising at least 60% by weight of microfibrillated cellulose.

* * * * *